(12) United States Patent
Lee

(10) Patent No.: US 8,462,485 B2
(45) Date of Patent: Jun. 11, 2013

(54) SWITCHGEAR FOR UNDERGROUND ELECTRIC POWER DISTRIBUTION LINE

(75) Inventor: Jae Gul Lee, Gyeonggi-Do (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 256 days.

(21) Appl. No.: 13/118,255

(22) Filed: May 27, 2011

(65) Prior Publication Data

US 2011/0304956 A1 Dec. 15, 2011

(30) Foreign Application Priority Data

Jun. 11, 2010 (KR) ........................ 10-2010-0055582

(51) Int. Cl.
*H02B 1/00* (2006.01)

(52) U.S. Cl.
USPC ............ 361/601; 361/602; 361/620; 361/623

(58) Field of Classification Search
USPC .................................. 361/611–612, 620, 623
See application file for complete search history.

(56) References Cited

U.S. PATENT DOCUMENTS

| | | | | |
|---|---|---|---|---|
| 4,821,141 A | * | 4/1989 | Torimi et al. | 361/612 |
| 4,967,307 A | * | 10/1990 | Itou et al. | 361/618 |
| 8,111,503 B2 | * | 2/2012 | Takeuchi et al. | 361/618 |
| 2003/0117769 A1 | * | 6/2003 | Yamane et al. | 361/612 |
| 2010/0259870 A1 | * | 10/2010 | Tanaka et al. | 361/618 |

FOREIGN PATENT DOCUMENTS

KR 1020100007231 1/2010

* cited by examiner

*Primary Examiner* — Gregory Thompson
(74) *Attorney, Agent, or Firm* — Lee, Hong, Degerman, Kang & Waimey

(57) ABSTRACT

A switchgear for a ground distribution line includes a base frame, vacuum switch units each installed on the base frame and configured by laying a first vacuum interrupter and a second vacuum interrupter within an epoxy resin mold, the first vacuum interrupter opening or closing a main circuit between a power source side and a load side and the second vacuum interrupter opening or closing a ground circuit, a main circuit interface protruding from one side of each vacuum switch unit, and a phase connector interface protruding from the other side of each vacuum switch unit in the same direction as the main circuit interface.

5 Claims, 5 Drawing Sheets

006
SWITCHGEAR FOR UNDERGROUND ELECTRIC POWER DISTRIBUTION LINE

CROSS-REFERENCE TO RELATED APPLICATION

Pursuant to 35 U.S.C. §119(a), this application claims the benefit of earlier filing date and right of priority to Korean Application No. 10-2010-0055582, filed on Jun. 11, 2010, the contents of which is incorporated by reference herein in its entirety.

BACKGROUND OF THE INVENTION

1. Field of the Invention

This specification relates to a switchgear, which is contactably installed at a ground electric power distribution line and has functions of line divergence, a circuit switching, and breaking a circuit between a line or an electric load side and an electric power source side when a fault current is detected on the line or load side, and particularly, to a switchgear for a ground distribution line, configured by insulating a conductor using epoxy or silicon as an insulating material and employing vacuum interrupters in each switch unit.

2. Background of the Invention

In general, an electric power generated in an electric power station is transmitted by a long-range transmission with ultra-high voltage via a power transmission line and the ultrahigh transmission voltage is supplied to consumers via an electric power distribution system in a state of being stepped down to a distribution voltage (for example 22.9 kilo volts) at a sub-station. The electric power distribution system of electric power systems is classified into an overhead distribution system and a ground distribution system.

A switchgear for a ground distribution line is an apparatus for performing several functions, such as diverging a line, opening or closing an electric circuit, or breaking a system when detecting a fault current, on a ground line of a ground distribution system of the transmission and distribution electric power systems.

A switchgear applied to the electric power distribution system is connected to a plurality of divergent circuits on a three-phase high-pressure distribution line to break a fault current and switching the electric circuit, so a multi-circuit switchgear that more than three or four three-phase switches are mounted in one product is used. Accordingly, sulfur hexafluoride ($SF_6$) gas is used for insulation between switches and insulation between phases. A tank as an enclosure is made to accommodate the switches therein and filled with the insulating gas to be sealed. A switching mechanism for switching switches into on position or off position is fixed to the outside of the tank. Also, in order to connect a conductor within the tank to an external cable, a bushing, which has a conductor therein and whose outside is molded by use of an insulating material, is used. The tank is made of steel. The tank is grounded to ensure user's safety. The related art switchgear for the ground distribution line having the structure uses the insulating gas for the insulation between phases, so it is also referred to as a gas-insulated switchgear.

The increase in electric power consumption derives a remarkable increase in use of the gas-insulated switchgear and $SF_6$ gas accordingly. However, the $SF_6$ gas has been pointed out as one of main factors causing global warming gas. The greenhouse effect on Earth caused due to the $SF_6$ gas is 23,900 times more severe than carbon dioxide. Hence, use of the $SF_6$ gas is under regulation or will be regulated around the world.

Hereinafter, description will be given of a typical configuration of a gas-insulated switchgear according to the related art.

FIG. 1 is a perspective view schematically showing a gas-insulated switchgear according to the related art, FIG. 2 is a perspective view that switch units and bus bars are connected to the gas-insulated switchgear of FIG. 1, and FIG. 3 is a view of a single switch unit of FIG. 1.

Referring to FIGS. 1 to 3, the related art gas-insulated switchgear includes a tank 1 containing $SF_6$ gas therein and defining an enclosure, a switching mechanism 2 for driving the switchgear to one of three positions, namely, closing, opening or earthing (grounding) positions, a ground mold cone 3 serving as a safety element for earthing a current charged in a conductor of each switch unit (including a movable contactor and a stationary contactor for each phase, see FIG. 3) within the tank 1, an element 4 for transforming a voltage supplied from an electric power source side to the switchgear as a Direct Current power source for a controller, an insulating cable 5 for connection of a power source bushing of the enclosure, a common bus bar 6 for connecting respective contactors within the switch units for each of R, S and T phases.

The switchgear further includes bushings 7 disposed at an outer surface of the switchgear and connected to a cable heading to a user to maintain an insulation with the tank 1 and simultaneously maintain an air-tight state for prevention of gas leakage when electrically connecting the conductor within the tank 1 to an external conductor, and switch units 8 each having an arc-extinguishing capability for extinguishing arc generated upon opening or closing the electric power circuit and each having a movable contactor 9 and a main circuit stationary contactor 11 or a ground circuit stationary contactor 12. Referring to FIG. 3, the movable contactor 9 contacts the stationary contactor 11 or 12 (i.e., moving to a closing position or ground position) or is separated from the stationary contactor 11 or 12 (i.e., moving to an opening position), to thus transfer or stop transferring an income current through the common bus bar 6 to the load side. A reference numeral 10 denotes a bus bar for connection of the common bus bar 6.

In the structure of the switch unit of FIG. 3, the main circuit stationary contactor 11 is connected to the bushing 7, and the ground circuit stationary contactor 12 is connected to the ground bushing, namely, the mold cone 3. Here, when the movable contactor 9 is connected to the ground circuit stationary contactor 12, a current charged in the conductor is discharged to the earth.

The related art gas-insulated switchgear includes 3 or 4 switch units 8 for 3 or 4 phases arranged in the tank 1. The switch units 8, namely, the switch units 8 for three R, S, T phases are connected to the common bus bar 6, respectively, and a driving shaft for driving the movable contactor 9 of each switch unit 8 is connected to the switching mechanism 2, thereby operating (driving) the movable contactor 9 of each switch unit 8 to one of three positions, namely, closing, opening and earthing positions. The switching mechanism 2 for each switch unit 8 is attached on the outside of the tank 1, and the switchgear has a display for informing a position (closing, opening or earthing position) of the corresponding switch unit 8. The tank 1 is filled with $SF_6$ gas, accordingly, arc generated when the switch unit 8 opens the load is extinguished and an insulation between conductors inside the tank 1 is maintained. Injection pressure of $SF_6$ gas is 6 to 10 psi. An explosion proof plate is mounted at a lower side of the tank to prevent damages caused by explosion of the tank 1 due to high pressure generated when a fault current breaking occurs in the tank 1.

However, the related art gas-insulated switchgear has the following problems.

First, use of SF$_6$ gas, which affects the global warming, will be restricted in the usage amount in future.

Second, the tank may be in danger of explosion due to an instantaneous pressure increase upon occurrence of a fault current breaking in the tank, which contains high-pressure gas.

Third, gas pressure affects insulation and arc-extinguishing capabilities, and accordingly maintenance for gas leakage is required, which results in requirements of manpower and costs.

Fourth, to fabricate the switch units, many constituting elements for constructing a conductive section, an insulating section and an arc-extinguishing section should be assembled, and such assembly requires excessive time.

Fifth, the structure that a plurality of circuits are air-tightly accommodated in one tank may make it difficult to repair and maintain the tank because the tank should be disassembled even for a locally simple repair and maintenance.

Sixth, the insulation between phases and the insulation between each phase-based switch unit and the earth within the tank completely depend on insulation capability of gas. Accordingly, upon occurrence of a ground fault or a shortage between phases, a local insulation problem within the tank may effect to the entire product, which may cause the product to be completely unusable.

SUMMARY OF THE INVENTION

Therefore, an aspect of the detailed description is to configure an interrupting section for one three-phase circuit by laying a ground switch and a main circuit switch within a solid insulator molded with epoxy resin to form an individual one-phase switch unit, and combining three of the switch units with one switching mechanism, and to provide a switchgear for a ground distribution line configured by combining a plurality of such interrupting sections.

Another aspect of the detailed description is to provide a switchgear for a ground distribution line capable of minimizing maintenance costs and time by virtue of partial replacement of a switch unit having an error upon repair and maintenance, by making one-phase switch unit have a vacuum interrupter for opening or closing a main circuit and a vacuum interrupter for opening or closing a ground circuit and forming one epoxy insulated vacuum switch unit using the two vacuum interrupters so as to allow each phase switch unit to be independent.

To achieve these and other advantages and in accordance with the purpose of this specification, as embodied and broadly described herein, a switchgear for a ground distribution line comprises a base frame;

vacuum switch units each installed on the base frame and configured by laying a first vacuum interrupter and a second vacuum interrupter within an epoxy resin mold, the first vacuum interrupter opening or closing a main circuit between a power source side and a load side and the second vacuum interrupter opening or closing a ground circuit;

a main circuit interface protruding from one side of each vacuum switch unit; and a phase connector interface (in other words bus bar interface) protruding from the other side of each vacuum switch unit in the same direction as the main circuit interface.

In the configuration of the switchgear for the ground distribution line, the main circuit interface and the phase connector interface may protrude towards a front surface of the switchgear, and the first and second vacuum interrupters may be disposed respectively above and below a connection conductor connected to the main circuit interface.

The switchgear may further comprise a phase connector member configured to connect vacuum switch units with the same phase, among the plurality of vacuum switch units, a potential transformer (PT) configured to step down a voltage of incoming power to a low voltage according to a predetermined rate and supply the low voltage as a power source, and a PT connection member 18 having one end connected to the PT and the other end connected to the phase connector member. Preferably, the middle portion of the PT connection member is made of a flexible material.

The PT connection member may comprise a phase connector connection portion connected to the phase connector member;

a PT connection portion connected to the PT; and a middle connection portion configured to connect the phase connector connection portion and the potential transformer connection portion to each other, wherein the middle connection portion may be formed of a flexible material.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings.

For the sake of brief description with reference to the drawings, the same or equivalent components will be provided with the same reference numbers, and description thereof will not be repeated.

Figure 4:
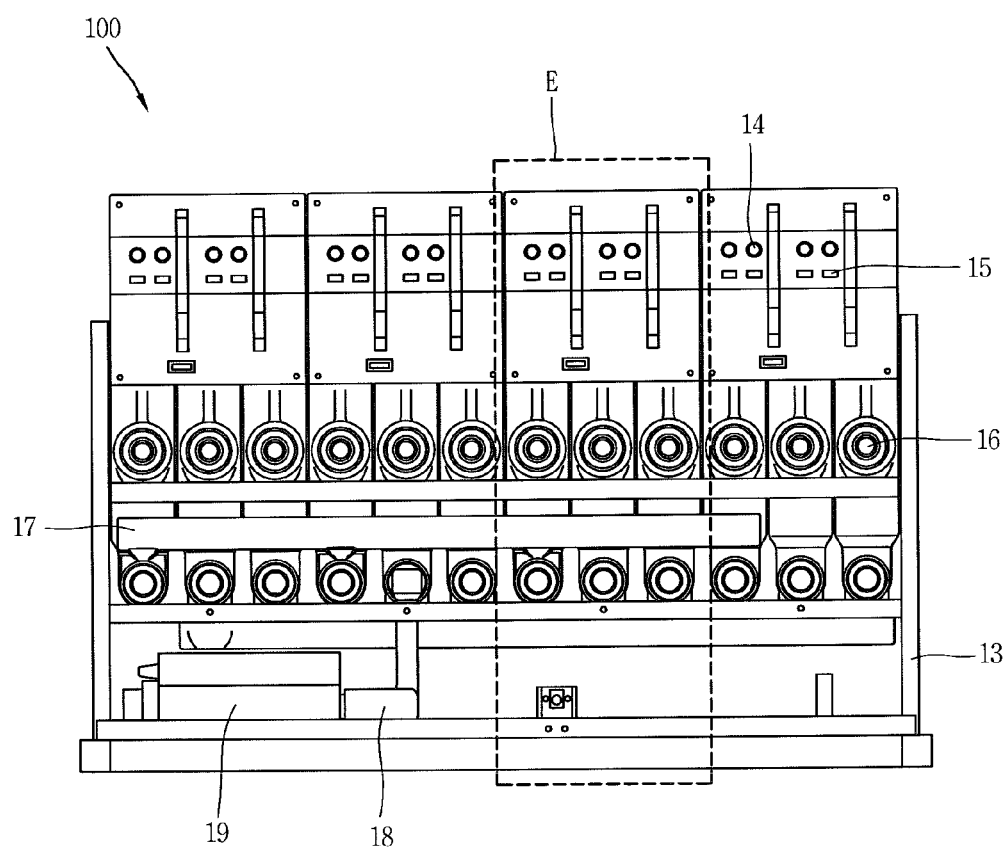
FIG. 4 is a front view of a switchgear for a ground distribution line in accordance with a preferred embodiment of the invention.
Figure 5:
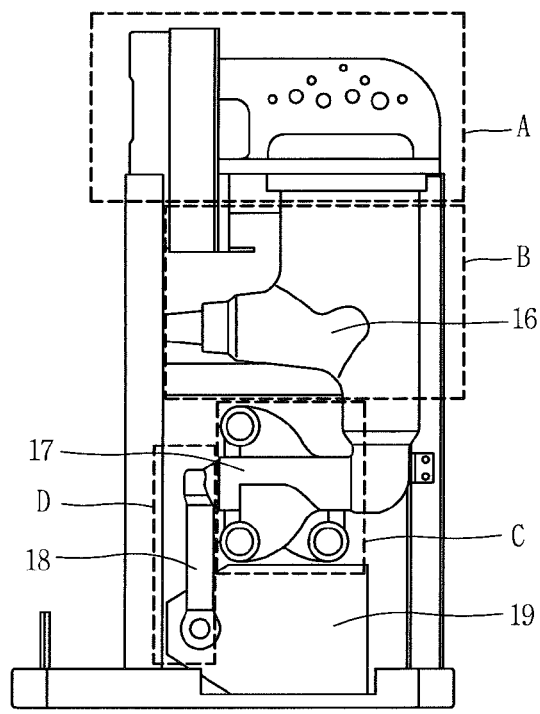
FIG. 5 is a side view of the switchgear for the ground distribution line in accordance with a preferred embodiment of the invention.

FIGS. 4 and 5 are a front view and a side view, respectively, showing a switchgear for a ground distribution line in accordance with this specification.

As shown in FIGS. 4 and 5, the switchgear 100 may include a switching mechanism and link assembly section A, a switch section B, a phase connector section C, a Potential Transformer (PT) connection section D and a PT 19. A reference numeral "E" in FIG. 4 indicates a set of a front manipulation part having a main circuit manipulation unit 14 and a ground circuit manipulation unit 15, a three-phase switch section B and a three-phase connector section C, partitioned with a dotted line on the front view of the switchgear.

In the switchgear 100, the switch section B is installed on a base frame 13 for each of three phases. Assuming that the three switch sections B are one set, four sets of the switch sections B are provided, namely, totally 12 switch sections B are provided. A switching mechanism and a link assembly, so-called a driving force transfer element, whose outer appearances are schematically shown within a rectangular box A defined by the dotted line in FIG. 5, may be connected respectively to the main circuit manipulation unit 14 and a ground circuit manipulation unit 15, which are connected to each set of switch sections B, as separate driving power sources, thereby driving a vacuum interrupter for opening or closing a main circuit, which will be explained later, to a circuit closing or opening position and a vacuum interrupter for opening or closing a ground circuit to a circuit closing or opening positions.

Figure 6:
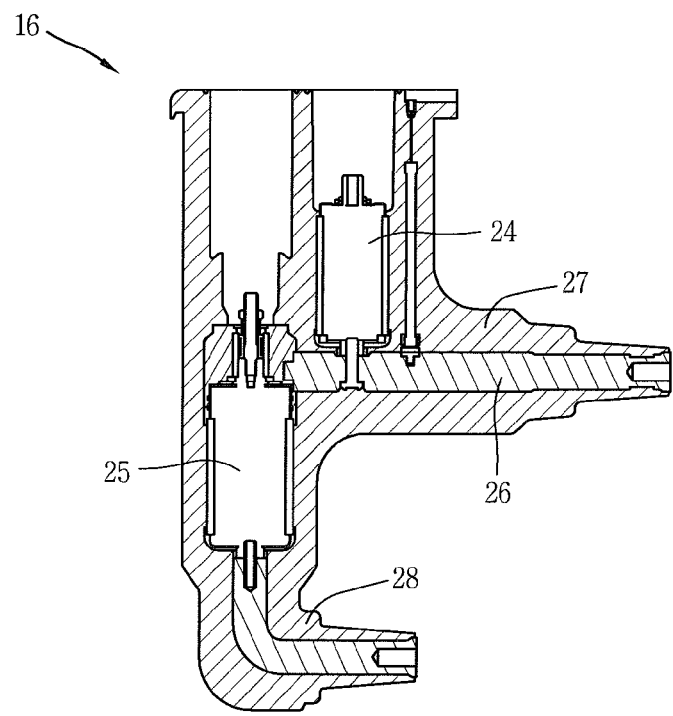
FIG. 6 is a longitudinal sectional view of a vacuum switch unit included in the switchgear for the ground distribution line in accordance with a preferred embodiment of the invention.

FIG. 6 is a sectional view showing a vacuum switch unit 16 included in the switchgear for the ground distribution line. The vacuum switch unit 16 may be configured by laying (installing) both a first vacuum interrupter 25 for opening or closing a main circuit and a second vacuum interrupter 24 for opening or closing a ground circuit within one epoxy resin mold, connecting the two vacuum interrupters 24 and 25 to both upper and lower positions of one connection conductor 26. This configuration may allow the one vacuum switch unit 16 to open and close the main circuit and the ground circuit for each phase.

Figure 1:
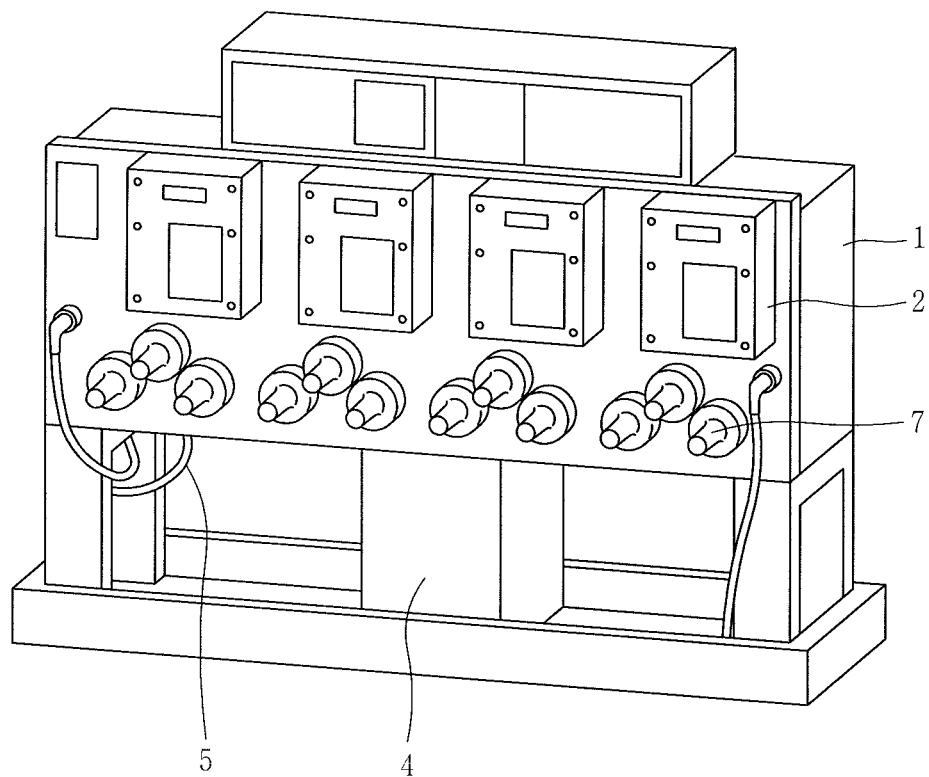
FIG. 1 is a perspective view schematically showing a gas-insulated switchgear according to the related art.
Figure 2:
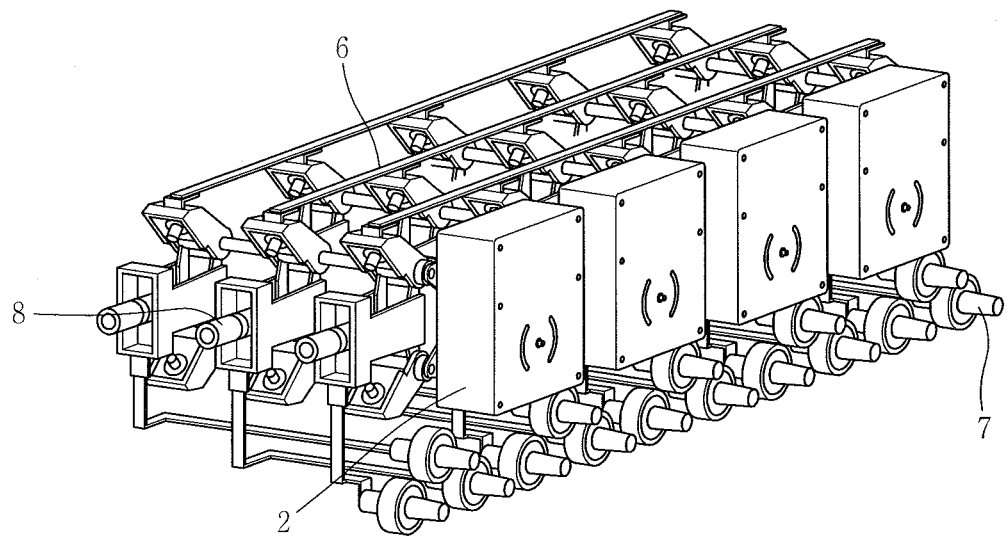
FIG. 2 is a partial perspective view showing a switch arrangement and a connected state of bus bars of FIG. 1.
Figure 3:
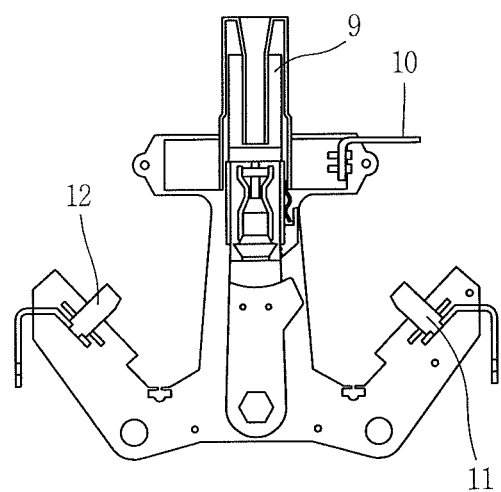
FIG. 3 is a front view of the switch unit in the configuration of FIG. 1.

In addition, the second vacuum interrupter 25 for opening or closing the ground circuit may be disposed at a front side, namely, at the front of the switchgear 100, to which an incoming and outgoing distribution lines are connected, so as to facilitate connection to a ground part (not given of a reference numeral but refer to a part indicated with the reference numeral 3 of FIG. 1) disposed at the front of the switchgear 100. When diverging a line or installing a line from the switchgear toward a load, a charge current of a conductor part, which may remain even after opening the main circuit (i.e., driving to the opening position), may be discharged by driving the second vacuum interrupter 24 to a closing position (i.e., grounding position), thereby protecting an operator from an electrical accident. To facilitate connection between the vacuum switch unit 16 and the same phase within the switch gear, namely, connection between the vacuum switch unit 16 and a phase connector member 17 installed at a lower side in FIG. 5, a phase connector interface (bus bar interface) 28 of the first vacuum interrupter 25 may face the same direction as a main circuit interface 27 and simultaneously a 90°-bent direction from a lengthwise direction of the vacuum switch unit 16.

The switchgear 100 may include the PT 19, by which an incoming power voltage is converted into a low voltage according to a predetermined rate and the converted low voltage is supplied to a controller (not shown). For example, the PT 19 steps down incoming ultrahigh voltage of several tens to hundreds kilo volts to a level of 220 volts as low as being measured by a typical watt-hour meter.

An exclusive PT connection member 18, which connects one phase connector member 17 to the PT 19, may be used to supply power source for the controller.

Figure 8:
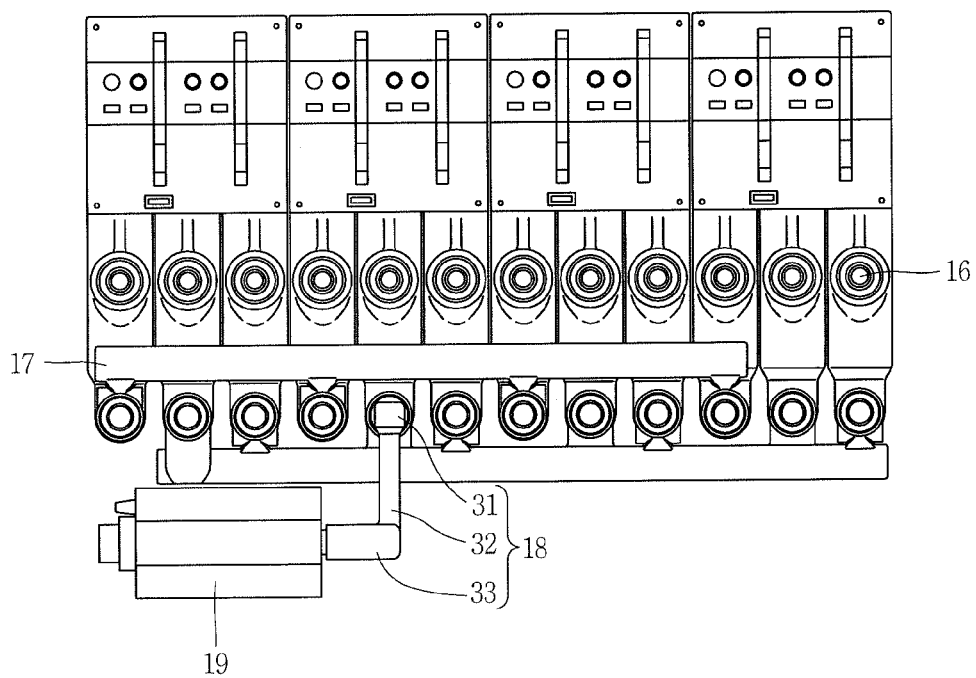
FIG. 8 is a partial front view of the switchgear for the ground distribution line in accordance with a preferred embodiment of the invention in the connected state of the PT connection member of FIG. 7.

Referring to FIG. 8, the switchgear may be allowed for easy assembly and maintenance thereof by the structure that the PT connection member 18 and the phase connector member 17 are connected to each other at the front of the switchgear.

Referring back to FIG. 4, the connection between the vacuum switch units 16 with the same phase, of the plurality of vacuum switch units 16, may be implemented for each phase alternating current (AC) of three R, S and T phases by use of the phase connector member 17. The phase connector member 17 may be fabricated by use of aluminum and diverged to the four circuits by being connected to four sets of three-phase vacuum switch units 16. Also, the surface of the phase connector member 17 may be molded with silicon or rubber so as to be semi-conductive. The semi-conductive surface part may be grounded to discharge a charge current to the earth, thereby improving user's safety.

A connected part of the phase connector member 17, which is connected with the vacuum switch unit 16, may have a perpendicular tube. An upper end of both ends of the perpendicular tube, namely, the connected part of the phase connector member 17, may be connected to the phase connector interface 28 of the vacuum switch unit 16, and a lower end thereof may be insulated by use of an insulation plug to allow an electrical connection of the phase connector interface 28 and an electrical insulation with a lower outside.

Figure 7:
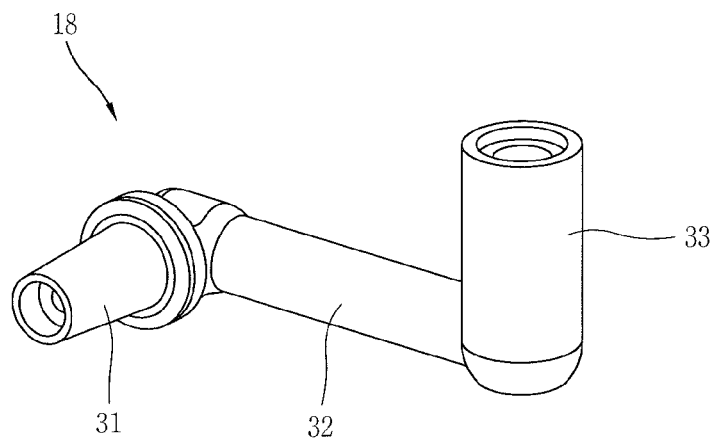
FIG. 7 is a perspective view showing a PT connection member included in the switchgear for the ground distribution line in accordance with a preferred embodiment of the invention.

FIG. 7 is a perspective view showing an outer appearance of the PT connection member 18, and FIG. 8 shows an assembled state that the PT connection member 18 is connected to the PT 19 and the phase connector member 17.

Referring to FIGS. 7 and 8, the PT connection member 18 may include the phase connector connection portion 31 connected to the phase connector member 17, a PT connection portion 33 connected to the PT 19, and a middle connection portion 32 perpendicular to the phase connector connection portion 31 and the PT connection portion 33, respectively. One end of the middle connection portion 32 may be perpendicularly connected to the phase connector connection portion 31 at a lower side and the other end thereof may be perpendicularly connected to the PT connection portion 33 at an upper side. Also, the phase connector connection portion 31 and the PT connection portion 33 may be perpendicular to each other. The middle connection portion 32 of the PT connection member 18 may be formed of a flexible material to facilitate its assembly even with the structure that the connected direction with the connector member 17 is different from the connected direction with the PT 19 (i.e., two directions having 90° difference from each other).

Not only the connection between the PT connection member 18 and the phase connector member 17 but also the connection between the PT connection member 18 and the PT 19 can be carried out at the front surface of the switchgear, thereby minimizing a working time and costs for installation and maintenance of the PT 19.

As described above, the switchgear for the ground distribution line may have an epoxy solid insulation configuration so as to have an advantage of non-use of $SF_6$ gas whose use is restricted due to acting as a main factor of the Earth warming.

The switchgear for the ground distribution line may have the epoxy solid insulation configuration, so it may present no danger of explosion.

The switchgear for the ground distribution line may have the epoxy solid insulation configuration, so it may not require manpower and costs for repair and maintenance relating to gas leakage.

In the configuration of the switchgear for the ground distribution line, each switch unit is disposed as a unit of vacuum interrupters molded with epoxy resin. Hence, the switchgear may require less constituting elements, which allows simple assembly upon installation and easy replacement for maintenance.

Also, in the configuration of the switchgear for the ground distribution line, each switch unit is disposed as the unit of vacuum interrupters molded with epoxy resin. Hence, a phase connector member and a PT connection member may be implemented as modules, so the corresponding modules can be easily efficiently replaced upon a local simple maintenance.

Furthermore, the switchgear for the ground distribution line may have the configuration that the phase-based switch unit, the phase connector member and the PT connection member may all be molded with epoxy or coated with a semi-conductive layer, thereby minimizing probability of occurrence of ground fault and shortage between phases. Also, the local insulation may be overcome simply by replacing the corresponding portion.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A switchgear for a ground distribution line comprising:
a base frame;
vacuum switch units each installed on the base frame and configured by laying a first vacuum interrupter and a second vacuum interrupter within an epoxy resin mold, the first vacuum interrupter opening or closing a main circuit between a power source side and a load side and the second vacuum interrupter opening or closing a ground circuit;
a main circuit interface protruding from one side of each vacuum switch unit; and
a phase connector interface protruding from the other side of each vacuum switch unit in the same direction as the main circuit interface.

2. The switchgear of claim 1, wherein the main circuit interface and the phase connector interface protrude towards a front surface of the switchgear.

3. The switchgear of claim 1, wherein the first and second vacuum interrupters are disposed respectively above and below a connection conductor connected to the main circuit interface.

4. The switchgear of claim 1, further comprising:
a phase connector member configured to connect vacuum switch units with the same phase, among the plurality of vacuum switch units;
a potential transformer configured to step down a voltage of incoming electric power to a low voltage according to a predetermined rate and supply the low voltage as an electric power source; and
a potential transformer connection member having one end connected to the potential transformer and the other end connected to the phase connector member.

5. The switchgear of claim 4, wherein the potential transformer connection member comprises:
a phase connector connection portion connected to the phase connector member;
a potential transformer connection portion connected to the potential transformer; and
a middle connection portion configured to connect the phase connector connection portion and the potential transformer connection portion to each other,
wherein the middle connection portion is formed of a flexible material.

* * * * *